US012330709B2

(12) United States Patent
Case Myers et al.

(10) Patent No.: US 12,330,709 B2
(45) Date of Patent: Jun. 17, 2025

(54) BALL NUT AND BALLSCREW ABSOLUTE POSITION SENSOR FOR VEHICLE STEERING SYSTEM

(71) Applicant: Steering Solutions IP Holding Corporation, Saginaw, MI (US)

(72) Inventors: Christopher R. Case Myers, Freeland, MI (US); Eric D. Pattok, Frankenmuth, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 263 days.

(21) Appl. No.: 18/078,550

(22) Filed: Dec. 9, 2022

(65) Prior Publication Data

US 2023/0286582 A1 Sep. 14, 2023

Related U.S. Application Data

(60) Provisional application No. 63/318,128, filed on Mar. 9, 2022.

(51) Int. Cl.
| | |
|---|---|
| *B62D 15/02* | (2006.01) |
| *F16H 25/20* | (2006.01) |
| *F16H 25/22* | (2006.01) |
| *F16H 25/24* | (2006.01) |
| *G01D 5/14* | (2006.01) |

(52) U.S. Cl.
CPC ..... *B62D 15/0225* (2013.01); *F16H 25/2015* (2013.01); *F16H 25/2204* (2013.01); *F16H 25/24* (2013.01); *G01D 5/142* (2013.01); *G01D 5/145* (2013.01); *G01D 2205/14* (2021.05);

(Continued)

(58) Field of Classification Search
None
See application file for complete search history.

(56) References Cited

U.S. PATENT DOCUMENTS 6,456,065 B2 * 9/2002 Hoshi .................... B62D 15/02
324/207.2
6,488,115 B1 * 12/2002 Ozsoylu ............... B62D 5/0427
180/402

(Continued)

FOREIGN PATENT DOCUMENTS

| CN | 108349526 A | * | 7/2018 | ......... B62D 15/0215 |
| CN | 108349526 B | * | 8/2020 | ......... B62D 15/0215 |

(Continued)

OTHER PUBLICATIONS

English translation of First Office Action regarding corresponding DE App. No. 10 2022 134 319.7; issued Nov. 15, 2024.

*Primary Examiner* — Kevin R Steckbauer
(74) *Attorney, Agent, or Firm* — Dickinson Wright PLLC

(57) ABSTRACT

An absolute position sensor includes a first gear having a plurality of teeth, a rotational position sensor operatively coupled to the first gear to be configured to detect a rotational position of the first gear, and a second gear including a spiral tooth engaged with the plurality of teeth of the first gear to rotate with the first gear, and having a first end with a first distance from a center of the second gear, and an opposite second end with a second distance from the center of the second gear, the second distance being less than the first distance.

20 Claims, 6 Drawing Sheets

(52) U.S. Cl.
CPC ..... *G01D 2205/26* (2021.05); *G01D 2205/28* (2021.05)

(56) References Cited

U.S. PATENT DOCUMENTS

| | | | | |
|---|---|---|---|---|
| 6,691,819 | B2* | 2/2004 | Menjak | B62D 6/003 701/41 |
| 7,284,634 | B2* | 10/2007 | Tatewaki | B62D 5/0424 180/443 |
| 7,293,626 | B2* | 11/2007 | Ozsoylu | B62D 5/0421 180/444 |
| 7,591,342 | B2* | 9/2009 | Ozsoylu | B62D 5/0421 180/444 |
| 9,212,892 | B2* | 12/2015 | Takayanagi | B62D 15/0245 |
| 9,227,653 | B2* | 1/2016 | Kita | B62D 3/126 |
| 10,011,295 | B2* | 7/2018 | Ohashi | F16F 15/08 |
| 11,332,182 | B2* | 5/2022 | Ishimura | B62D 5/005 |
| 11,454,300 | B2* | 9/2022 | Hagihara | F16H 1/16 |
| 11,465,682 | B2* | 10/2022 | Walentowski | G01L 5/221 |
| 11,505,238 | B2* | 11/2022 | Yang | B62D 3/04 |
| 11,649,041 | B2* | 5/2023 | Tofflemire | B64C 25/20 244/102 R |
| 11,801,885 | B2* | 10/2023 | Park | B62D 15/0225 |
| 11,827,290 | B2* | 11/2023 | Kadam | B62D 5/0409 |
| 11,873,037 | B2* | 1/2024 | Washnock | B62D 3/10 |
| 11,897,549 | B2* | 2/2024 | Jeon | F16H 7/02 |
| 12,060,938 | B2* | 8/2024 | Kwon | H02K 7/116 |
| 2001/0004720 | A1* | 6/2001 | Hoshi | B62D 15/02 701/41 |
| 2002/0148672 | A1* | 10/2002 | Tatewaki | F16H 55/18 180/443 |
| 2003/0051938 | A1* | 3/2003 | Menjak | B62D 5/0448 180/444 |
| 2004/0163878 | A1* | 8/2004 | Palfenier | G01D 5/04 180/444 |
| 2005/0092119 | A1* | 5/2005 | Palfenier | F16H 55/18 74/443 |
| 2014/0208890 | A1* | 7/2014 | Takayanagi | B62D 15/0245 74/552 |
| 2014/0311263 | A1* | 10/2014 | Washnock | B62D 3/08 74/89.14 |
| 2016/0280253 | A1* | 9/2016 | Ueno | B62D 3/12 |
| 2017/0158227 | A1* | 6/2017 | Katzourakis | B62D 6/008 |
| 2017/0267277 | A1* | 9/2017 | Ohashi | B62D 3/126 |
| 2019/0351932 | A1* | 11/2019 | Washnock | B62D 5/0454 |
| 2020/0231209 | A1* | 7/2020 | Walentowski | B62D 15/0215 |
| 2020/0391784 | A1* | 12/2020 | Saito | B62D 5/001 |
| 2021/0123504 | A1* | 4/2021 | Kopecek | F02K 1/763 |
| 2021/0239185 | A1* | 8/2021 | Hagihara | F16H 1/12 |
| 2021/0276611 | A1* | 9/2021 | Yang | B62D 3/04 |
| 2022/0024566 | A1* | 1/2022 | Tofflemire | B64D 45/0005 |
| 2022/0135118 | A1* | 5/2022 | Kadam | B62D 5/0409 74/388 PS |
| 2022/0185362 | A1* | 6/2022 | Kinne | B62D 3/126 |
| 2022/0266891 | A1* | 8/2022 | Park | B62D 5/0481 |
| 2022/0281516 | A1* | 9/2022 | Washnock | B62D 5/0481 |
| 2022/0282788 | A1* | 9/2022 | Kwon | H02K 1/16 |
| 2022/0348250 | A1* | 11/2022 | Jeon | F16H 7/02 |
| 2022/0348252 | A1* | 11/2022 | Min | B62D 5/0454 |
| 2023/0286582 | A1* | 9/2023 | Case Myers | G01D 5/142 |
| 2024/0034395 | A1* | 2/2024 | Yeom | B62D 5/064 |
| 2024/0300570 | A1* | 9/2024 | Washnock | B62D 5/0454 |

FOREIGN PATENT DOCUMENTS

| | | | |
|---|---|---|---|
| CN | 113335379 B * | 7/2023 | ............ B62D 1/20 |
| CN | 116733920 A * | 9/2023 | ........ B62D 15/0225 |
| DE | 29906818 U1 | 7/1999 | |
| DE | 60034649 T2 | 1/2008 | |
| DE | 102015013965 A1 * | 5/2017 | ........ B62D 15/0215 |
| DE | 102016208317 A1 | 11/2017 | |
| DE | 102018115099 A1 | 12/2018 | |
| DE | 102021103305 A1 * | 9/2021 | ............ B62D 1/20 |
| DE | 102022134319 A1 * | 9/2023 | ........ B62D 15/0225 |
| EP | 3782875 A1 * | 2/2021 | ........ B62D 15/0245 |
| JP | 61247568 A | 11/1986 | |
| JP | 2009001247 A * | 1/2009 | |
| WO | 2008081228 A1 | 7/2008 | |
| WO | WO-2019221064 A1 * | 11/2019 | ............ F16H 1/12 |
| WO | WO-2020256336 A1 * | 12/2020 | ........ B62D 15/0225 |

* cited by examiner

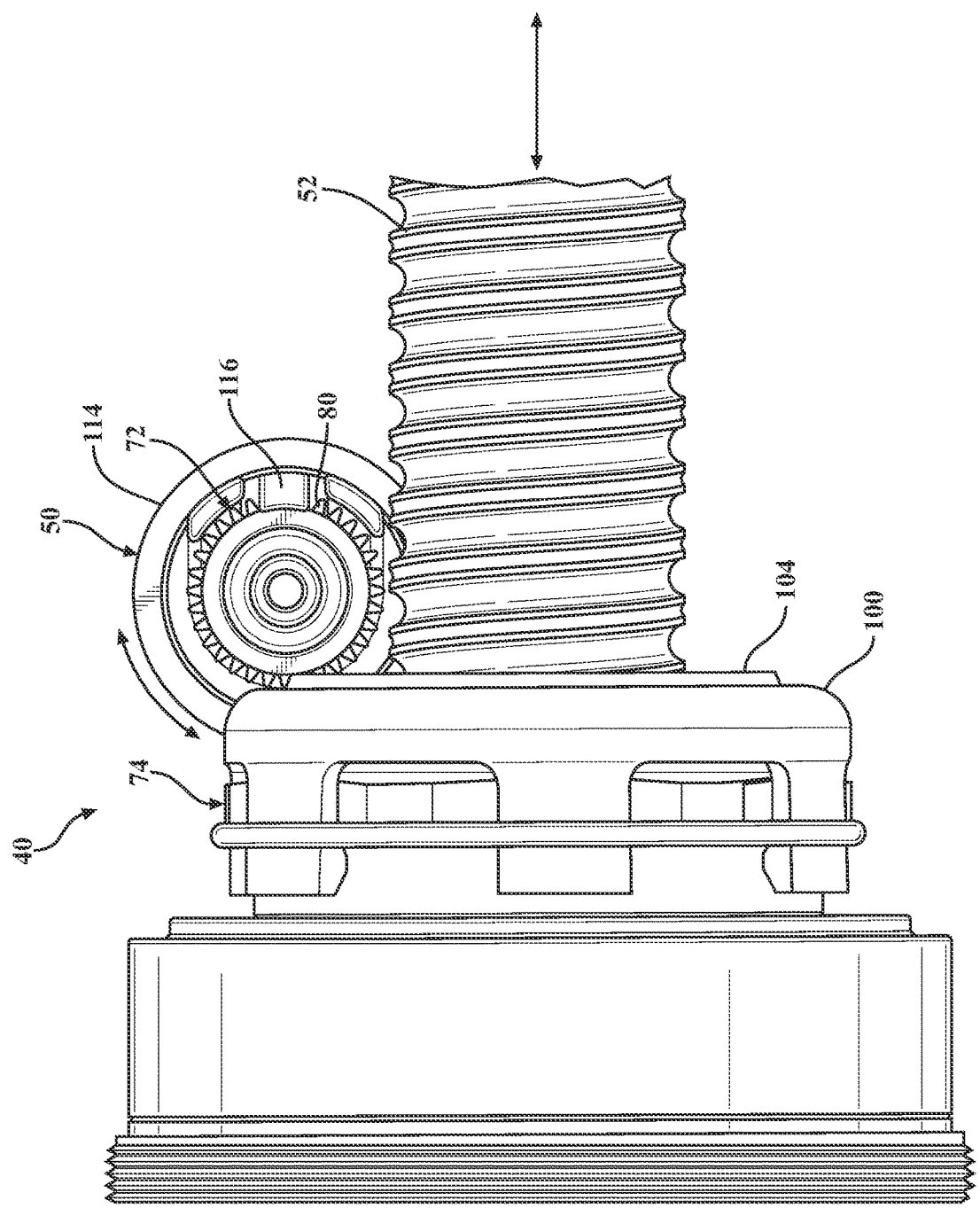

BALL NUT AND BALLSCREW ABSOLUTE POSITION SENSOR FOR VEHICLE STEERING SYSTEM

CROSS-REFERENCE TO RELATED APPLICATION

The present disclosure claims the benefit of Provisional Patent Application No. 63/318,128 entitled "BALL NUT AND RACK ABSOLUTE POSITION SENSOR FOR VEHICLE STEERING SYSTEM", and filed on Mar. 9, 2022, the contents of which are incorporated by reference in its entirety.

FIELD OF THE INVENTION

The present disclosure relates to vehicle steering systems and, more specifically, to a ball nut and ball screw absolute position sensor for such steering systems.

BACKGROUND

Various electric power steering (EPS) systems have been developed for assisting an operator with vehicle steering. One type of EPS system is referred to as a rack electric power steering (REPS) system. A REPS system utilizes an electric motor that drives a ball nut and rack. The rack teeth are engaged with a pinion. The pinion complements a driving feature that is rotated in response to rotation of a portion of the steering column by an operator, with the driving feature providing a steering input to the rack. The driving feature may be integrated with the steering column (i.e., single pinion electric power steering system) or may be a driving pinion (i.e., dual pinion electric power steering system), for example.

Absolute position sensing on a steering system may be done by using a set of gear wheels and sensors based off the rotating pinion or input shaft of the vehicle. These systems tend to use a gear on the shaft that drives two additional gears to allow the sensor to correctly calculate the rack, or steering, position at vehicle startup or initialization prior to using another sensor such as the motor position.

SUMMARY OF THE DISCLOSURE

According to one aspect of the disclosure, An absolute position sensor includes a first gear having a plurality of teeth, a rotational position sensor operatively coupled to the first gear to be configured to detect a rotational position of the first gear, and a second gear including a spiral tooth engaged with the plurality of teeth of the first gear to rotate with the first gear, and having a first end with a first distance from a center of the second gear, and an opposite second end with a second distance from the center of the second gear, the second distance being less than the first distance.

According to another aspect of the disclosure, an electric power steering system includes a ballscrew-nut assembly including a ballscrew, a nut, and a motor operatively coupled to one of the ballscrew and the nut to be configured to rotate the one of the ballscrew and the nut, and an absolute position sensor including a first gear having a plurality of teeth, a rotational position sensor operatively coupled to the first gear to be configured to detect a rotational position of the first gear, and a second gear coupled to one of the ballscrew and the nut and including a spiral tooth engaged with the plurality of teeth of the first gear to rotate with the first gear, the spiral tooth having a first end with a first distance from a center of the second gear, and an opposite second end with a second distance from the center of the second gear, the second distance being less than the first distance.

According to yet another aspect of the disclosure, an electric power steering system includes a ballscrew, a nut engaged with the ballscrew, such that rotation of the nut relative to the ballscrew moves the ballscrew through the nut, and an absolute position sensor including a first gear having a plurality of teeth, a rotational position sensor operatively coupled to the first gear to be configured to detect a rotational position of the first gear, and a second gear concentrically arranged around the ballscrew to rotate with one of the ballscrew and the nut, the second gear engaged with the plurality of teeth of the first gear to be configured to rotate with the first gear.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 schematically depicts a partial front view of the ballscrew-nut assembly and absolute position sensor assembly of FIG. 3, according to one or more embodiments shown and described herein;

DETAILED DESCRIPTION

The embodiments described herein are used in conjunction with a steering assembly of a vehicle, such as a car, truck, sport utility vehicle, crossover, mini-van, marine craft, aircraft, all-terrain vehicle, recreational vehicle, or other suitable vehicles, including various steering system schemes.

Figure 1:
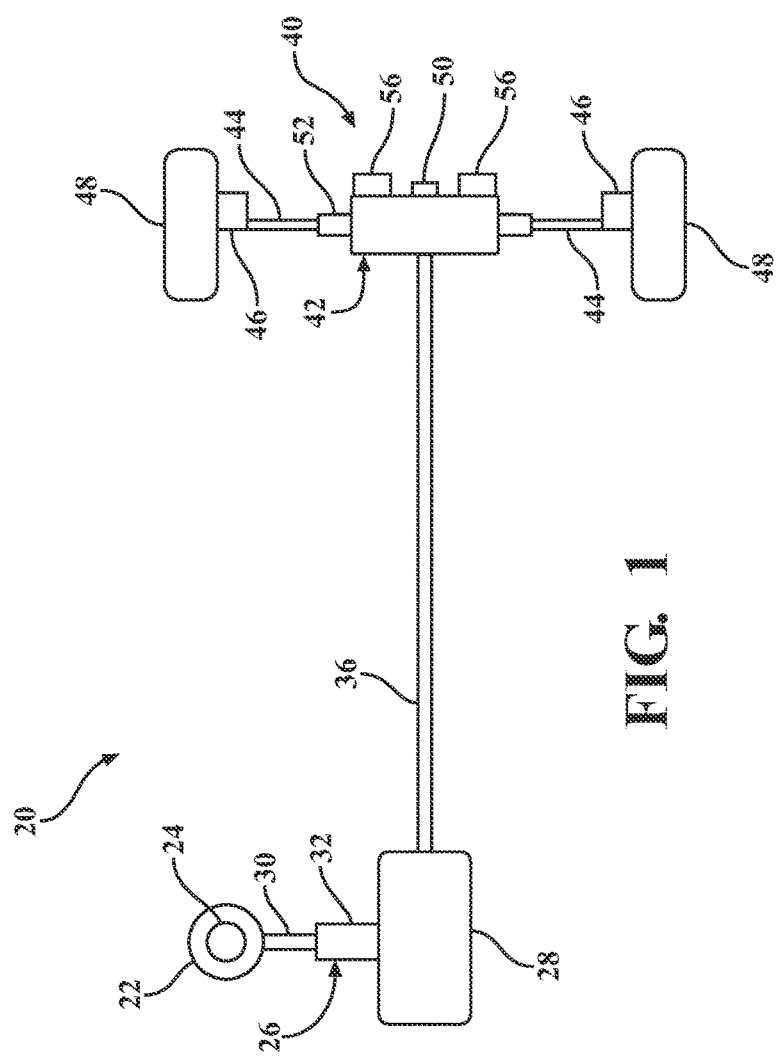
FIG. 1 schematically depicts an electric power steering system for a vehicle including a ballscrew-nut assembly, according to one or more embodiments shown and described herein.

Referring initially to FIG. 1, an electric power steering system 20 having an absolute position sensor assembly 50 is generally illustrated. The absolute position sensor assembly 50 is configured to detect an absolute position of a steering assembly 40, and allows for moving position sensing from the input/pinion shaft to the ball nut-steering axis, thereby allowing the removal of this axis for any application that doesn't require an input/pinion shaft, e.g., steer-by-wire systems. The power steering system 20 may be configured as a driver interface steering system, an autonomous driving system, or a system that allows for both driver interface and autonomous steering. The steering system 20 may include an input device 22, such as a steering wheel, wherein a driver may mechanically provide a steering input by turning the steering wheel, an airbag device 24 located on or near the input device 22, and a steering column 26 extending along an axis from the input device 22 to an output assembly 28. The steering column 26 may include at least two axially adjustable parts, for example, a first portion 30 and a second portion 32 that are axially adjustable with respect to one another to move the input device 22 closer or further away from a driver. The first portion 30 and the second portion 32 may be an upper jacket and a lower jacket that are axially movable relative to one another. The embodiments disclosed herein are utilized in electric steering systems where the output assembly 28 is in operative communication with a motor 56 of a steering assembly 40. The steering systems may be a steer-by-wire configuration, where the output assembly 28 is communicatively coupled to the motor 56 to control operation of the motor 56. In this configuration, the output assembly 28 may have a wired connection with the motor 56. Alternatively the steering systems may be a mechanical configuration, where the output assembly 28 is communicatively coupled to the motor 56 by a shaft 36 connected to the steering column 26 to transfer physical rotation from the input device 22 to the motor 56.

Referring still to FIG. 1, the steering assembly 40 may include a ballscrew-nut assembly 42, a pair of tie rods 44, a pair of knuckles 46, and a pair of wheels 48 operatively coupled to the pair of knuckles 46 to permit the knuckles 46 to pivot the wheels 48. The ballscrew-nut assembly 42 may include a ballscrew 52, a nut 54, at least one motor 56, and the absolute position sensor assembly 50. The at least one motor 56 may be a pair of motors, and is operatively coupled to one of the ballscrew 52 and the nut 54 to move the ballscrew 52 axially. The ballscrew 52 may be configured to move in a vehicle width direction toward and away from each wheel 48. The pair of tie rods 44 may be coupled to each end of the ballscrew 52 to move with the ballscrew 52, and the tie rods 44 may be operatively coupled to the pair of knuckles 46 to pivot the pair of knuckles 46 and the pair of wheels 48, thereby steering the vehicle. The absolute position sensor assembly 50 may be operatively coupled to one of the ballscrew 52 and the nut 54 to be configured to detect an absolute position of the ballscrew 52 and, therefore, an absolute position of the wheels 48.

Figure 2:
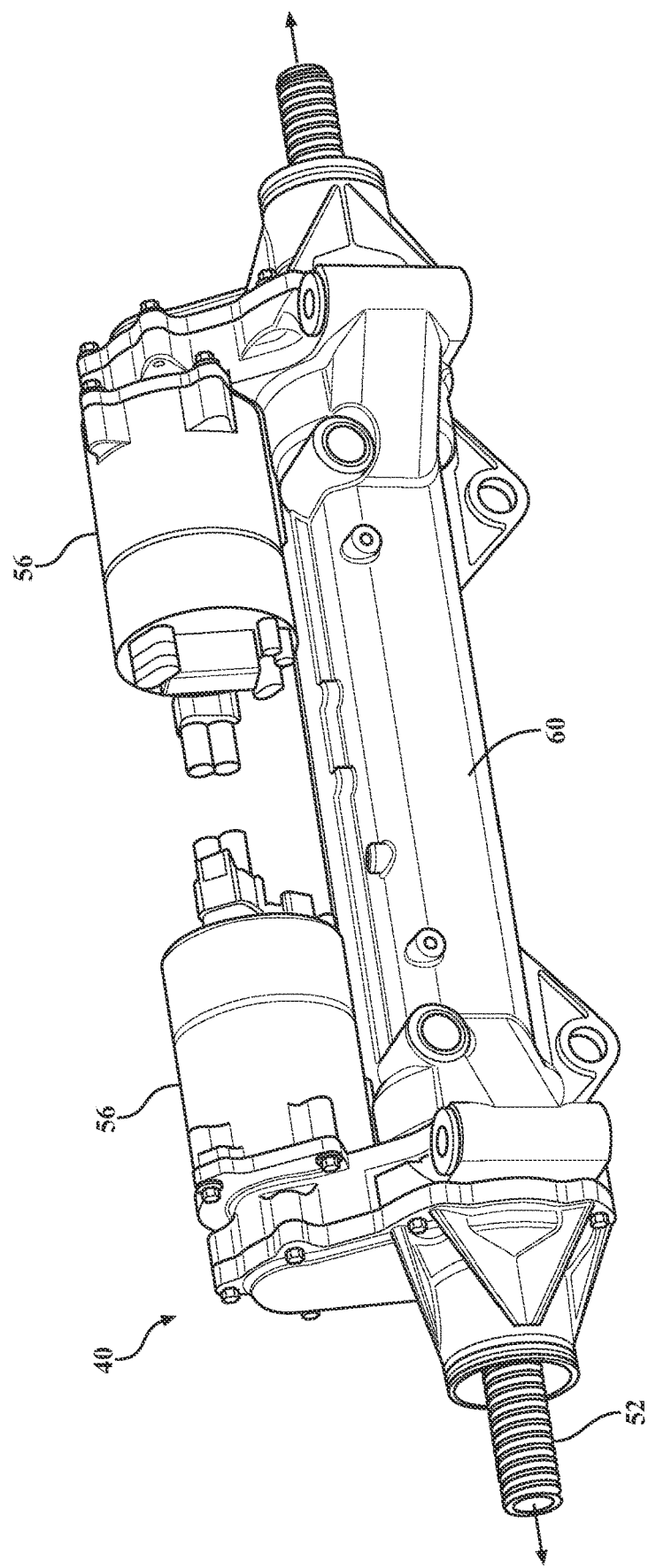
FIG. 2 schematically depicts a front perspective view of the ballscrew-nut assembly of FIG. 1, according to one or more embodiments shown and described herein.
Figure 3:
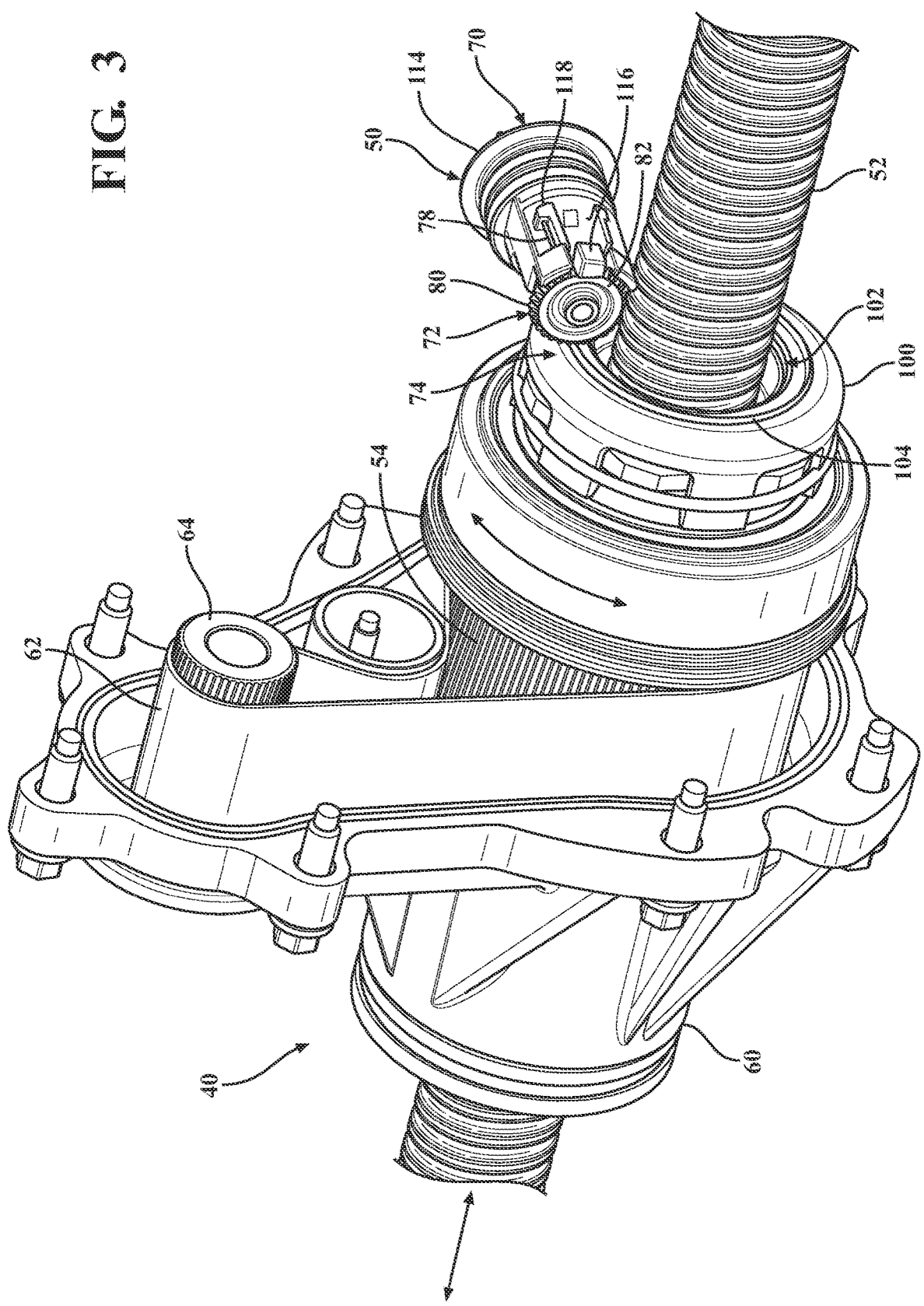
FIG. 3 schematically depicts a partial front perspective view of the ballscrew-nut assembly of FIG. 2 including an absolute position sensor assembly, according to one or more embodiments shown and described herein.
Figure 6:
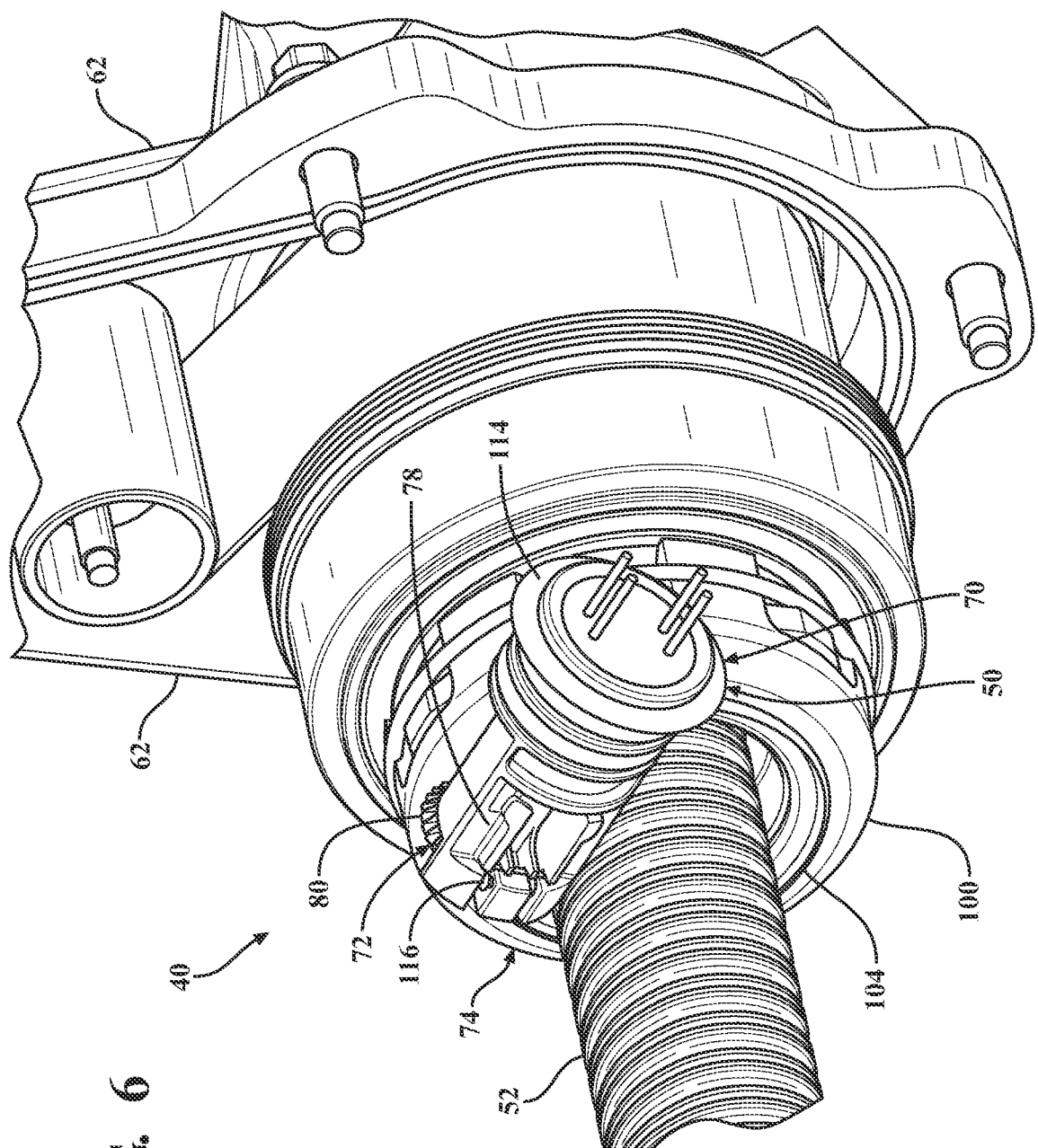
FIG. 6 schematically depicts a partial rear perspective view of the ballscrew-nut assembly and absolute position sensor assembly of FIG. 3, according to one or more embodiments shown and described herein.
Figure 7:
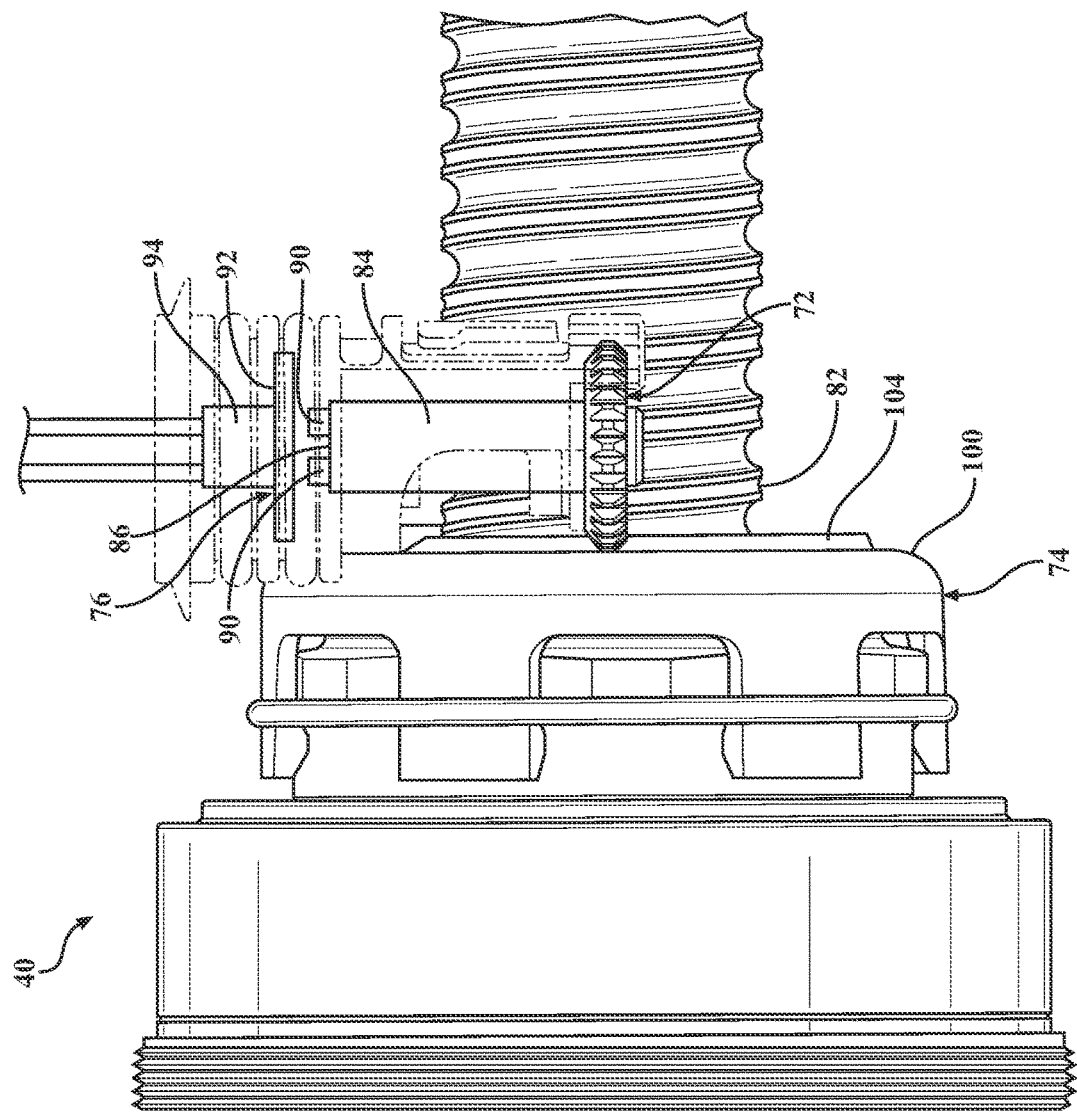
FIG. 7 schematically depicts a partial top view of the ballscrew-nut assembly and absolute position sensor assembly of FIG. 3, according to one or more embodiments shown and described herein.

Referring to FIGS. 2 and 3, the ballscrew-nut assembly 42 is depicted. The ballscrew-nut assembly 42 may include an enclosure 60 that at least partially encloses the motors 56, the absolute position sensor assembly 50, and the ballscrew 52 attached to the nut 54. The nut 54 is rotatably coupled to and engaged with the ballscrew 52 such that rotation of the nut 54 relative to the ballscrew 52 moves the ballscrew 52 through the nut 54 in the vehicle width direction. Alternatively, the ballscrew 52 may rotate while the nut 54 is fixed to move the ballscrew 52 through the nut 54 in the vehicle width direction. As shown in FIG. 3, each motor 56 may include a belt 62 that transfers rotation from a spindle 64 of the motor 56 to the nut 54. In embodiments where the ballscrew-nut assembly 42 includes two motors 56, the ballscrew-nut assembly 42 includes two nuts 54, each being operatively coupled to one of the motors 56 to be driven by the respective motor 56. The rotation of the nut 54 moves the ballscrew 52 through the nut 54 through the threaded engagement between the nut 54 and the ballscrew 52. The coupling of the ballscrew 52 to the tie rods 44, and the knuckles 46 and wheels 48 through the tie rods 44, may restrict the ballscrew 52 from rotating with the nut 54. Alternatively or additionally, the ballscrew 52 may be in threaded engagement with the enclosure 60 that prevents the ballscrew 52 from rotating as the nut 54 rotates. While the motor 56 is depicted being operatively coupled to the nut 54, it is contemplated and possible that the motor 56 is operatively coupled to the ballscrew 52 to rotate the ballscrew 52 relative to the nut 54. In such embodiments, the nut 54 is fixed, such as to a vehicle structure or frame, to restrict movement and rotation of the nut 54. Further, the ballscrew 52 may be rotatably coupled to the tie rods 44, such as by bearings, so that the ballscrew 52 may rotate relative to the tie rods 44.

Referring to FIG. 3, the absolute position sensor assembly 50 may include a housing 70, a first gear 72, a second gear 74, a rotational position sensor 76 configured to detect a rotational position of the first gear 72, and a biasing member 78. The first gear 72 may include a plurality of teeth 80 circumscribing a body 82, and a hub 84 extending from the body 82. The first gear 72 may be any gear for transferring rotation from the second gear to the rotational position sensor 76, such as, for example, a spur gear with straight teeth, a helical gear with angled teeth, or having involute profile teeth. The hub 84 may extend along an axis that the plurality of teeth 80 rotate about, and have an end 86 spaced apart from the body 82 of the first gear 72. The axis may be transverse to the ballscrew 52 such that the first gear 72 is positioned to be in a worm gear arrangement with the second gear 74 to monitor the steering position, or ballscrew position, based off the rotational motion of the ballscrew axis of the steering system 20. In other words, the first gear 72 may rotate about an axis transverse to an axis of rotation of the second gear 74.

As depicted, the first gear 72 may be coupled at a single end to the enclosure of the ballscrew-nut assembly 42 to be cantilevered into contact with the second gear 74. However, it is contemplated and possible that the first gear 72 is supported at both ends to be in contact with the second gear 74.

The rotational position sensor 76 may be coupled to the end of the hub 84 of the first gear 72. The rotational position sensor 76 may be a Hall-effect sensor including a pair of magnets 90, a sensor board 92 that detects the position of the magnets 90, and a controller 94 communicatively coupled to the sensor board 92 to receive signals from the sensor board 92 indicative of a position of the magnets 90. The pair of magnets 90 may be coupled to and radially offset from the axis, or a center of the hub 84 of the first gear 72, to rotate with the first gear 72. The sensor board 92 may be positioned adjacent the end 86 of the hub 84 so that as the pair of magnets 90 rotate with the first gear 72, where the sensor board 92 may determine a rotational position of the first gear 72. The sensor board 92 sends signals to the controller 94 indicative of the rotational position of the first gear 72 based on the position of the magnets 90, and the controller 94 determines a position of the ballscrew 52 based on the rotational position of the first gear 72.

Figure 4:
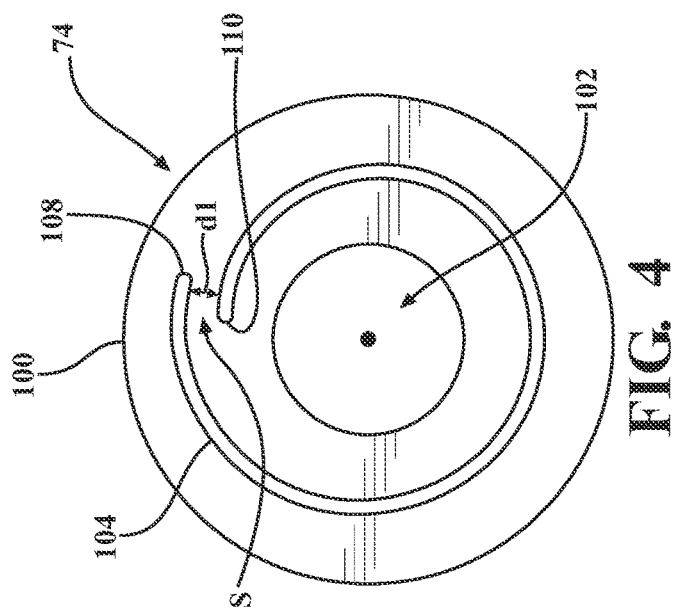
FIG. 4 schematically depicts a front view of a gear with a spiral tooth of the ballscrew-nut assembly of FIG. 2, according to one or more embodiments shown and described herein.

Referring to FIGS. 3 and 4, the second gear 74 may include a body 100 defining an opening 102 at a center of the body 100, and a spiral tooth 104 extending around the opening 102. The body 100 may be coupled to one of the nut 54 and the ballscrew 52 with the ballscrew 52 extending through the opening 102 in the body 100. The body 100 is operatively coupled to the one of the ballscrew 52 and the nut 54 that is rotated by the motor 56 to rotate with that one of the ballscrew 52 and the nut 54. For example, in embodiments that the motor 56 drives, or rotates, the nut 54, the second gear 74 is coupled to the nut 54 to rotate with the nut 54. In the alternative, in embodiments that the motor 56 drives the ballscrew 52, the second gear 74 is coupled to the ballscrew 52. The coupling between the second gear 74 and the one of the ballscrew 52 and the nut 54 allows the rotational position sensor 76 to detect the position of the ballscrew 52 via the rotation of the second gear 74. The second gear 74 may be mounted to the ballscrew 52 to rotate around the centerline of the ballscrew 52, and may be a feature on an existing ball nut mechanism as a secondary component attached to the ball nut mechanism, or as a separate rotating component in the housing along the ballscrew axis.

Referring to FIG. 4, the spiral tooth 104 includes a first end 108 and an opposite second end 110, the spiral tooth 104 extending at least partially around the opening 102 between the first end 108 and the opposite second end 110. The spiral tooth 104 may extend partially around, a full rotation around, or more than a full rotation around the center, or opening 102, of the second gear 74. In embodiments where the spiral tooth 104 extends a single rotation, the first end 108 of the spiral tooth 104 may be a first distance from the center or the opening 102, and the second end 110 of the spiral tooth 104 may be a second distance from the center or the opening 102, where the second distance is less than the first distance. The difference between the first distance and the second distance may be equal to either a width of each tooth 80 on the first gear 72 or the distance between the apexes of adjacent teeth 80 of the first gear 72. This arrangement permits a single rotation of the second gear 74 to rotate the first gear 72 to move one tooth of the plurality of teeth 80 to a position of an adjacent tooth 80 of the plurality of teeth 80. However, it is contemplated and possible that a single rotation of the second gear 74 rotates the first gear 72 to move the one tooth 80 more or less than the position of the adjacent tooth 80. In embodiments where the spiral tooth 104 extends more than a full rotation around the center, the spiral tooth 104 may define a spacing S between each pass of the spiral that has a distance d1. The distance d1 may be equal to a width of each tooth on the first gear 72, or a distance between each apex of each adjacent tooth of the first gear 72.

The distance d1 of the spacing S defined by the spiral tooth 104 affects the rotation of the first gear 72 as the second gear 74 rotates. For example, when the distance d1 of the spacing S is increased, the gear ratio between the second gear 74 and the first gear 72 is decreased, such that rotation of the first gear 72 is increased for each rotation of the second gear 74. The gear ratio between the first gear 72 and the second gear 74 permits the first gear 72 to be limited to a single rotation over an entire length of travel of the ballscrew 52. For example, the motor 56 may rotate the nut 54 32 rotations to move the ballscrew 52 over the entire length of travel, pivoting the wheels 48 from a right turn configuration to a left turn configuration, and vice versa. In this example, the gear ratio of the second gear 74 to the first gear 72 would be equal to or greater than 32:1 to restrict the first gear 72 to rotating a single rotation or less, where a single rotational position of the first gear 72 is associated with a single position of the ballscrew 52. In other words, the magnets 90 on the first gear 72 are never in more than one position over the entire length of travel of the ballscrew 52, so that a single position of the wheels 48 is associated with a single rotational position of the first gear 72. Therefore, the rotational position sensor 76 of the absolute position sensor assembly 50 can detect the absolute position of the ballscrew 52 without the use of additional gears. In this described worm gear arrangement, the second gear 74 may be larger than the first gear 72, for example, the teeth of the first gear 72 having a smaller radius than the spiral tooth 104 of the second gear 74, to change large axial travel into small rotational motion on a perpendicular axis.

Referring to FIGS. 3 and 5-7, the housing 70 may include a sensor enclosure 114 that encloses the hub 84 of the first gear 72 and the rotational position sensor 76, and a biasing structure 116 coupled to the enclosure 114 by a living hinge 118. The biasing structure 116 extends from the sensor enclosure 114 to partially extend over the plurality of teeth 80 of the first gear 72. In other words, the biasing structure 116 extends over a part of the circumference of the plurality of teeth 80. The biasing member 78 is engaged with the biasing structure 116 to bias the biasing structure 116 into the plurality of teeth 80 of the first gear 72. The biasing structure 116 may be shaped (e.g., concave) to be complementary to the circumference of the first gear 72 to limit interference with the rotation of the first gear 72 and movement of the plurality of teeth 80. The biasing member 78 may be coupled to the sensor enclosure 114 of the housing 70 and extend to the biasing structure 116 to bias the biasing structure 116 into contact with the first gear 72. The biasing force from the biasing member 78 and the biasing structure 116 on the first gear 72 biases the first gear 72 toward the second gear 74 to mesh the first gear 72 and the second gear 74, preventing lash between the first gear 72 and the second gear 74.

Referring to FIGS. 1-7, in operation, the controller 94 may determine an initial position of the ballscrew 52 and the related position of the wheels 48. The controller 94 may determine this position at a start up of the vehicle. A driver may then actuate the input device 22 to turn the wheels 48 of the vehicle, where the output assembly 28 receives the input from the input device 22, and sends a signal to the motor 56 to actuate the steering assembly 40. Upon receiving the signal from the output assembly 28, the motors 56 rotate the respective spindles and transferring rotation to the respective nut 54 through the belt 62. The rotation of the nut 54 causes the ballscrew 52 to move through the nut 54 in the vehicle width direction, moving the tie rods 44 with the ballscrew 52, thereby rotating the knuckles 46 and the wheels 48 to steer the vehicle. As the ballscrew 52 moves and the first gear 72 rotates, the controller 94 continuously determines the position of the ballscrew 52 and wheels 48 based on the contemporaneous position of the first gear 72.

The described type of sensor mechanization is a core requirement of systems that do not have an input shaft, as the motor sensor currently doesn't provide and exact steering position at startup. The embodiments are scaled so the rotation of the perpendicular shaft is at or below one rotation for the length of ballscrew travel required, thereby allowing the use of a single gear pair in contrast to current three gear pairs required on current position sensor designs because of the multiple input turns to get discrete position solutions. This is beneficial for new steer-by-wire system designs where the driver input is no longer required and allows the removal of perpendicular components of the pinion axis from a system architecture that still requires an absolute position sensing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An absolute position sensor comprising:
    a first gear having a plurality of teeth;
    a rotational position sensor operatively coupled to the first gear to be configured to detect a rotational position of the first gear; and
    a second gear comprising a spiral tooth engaged with the plurality of teeth of the first gear to rotate with the first gear, and having a first end with a first distance from a center of the second gear, and an opposite second end with a second distance from the center of the second gear, the second distance being less than the first distance.

2. The absolute position sensor of claim 1, wherein a difference between the first distance and the second distance is equal to a distance between apexes of adjacent teeth of the plurality of teeth.

3. The absolute position sensor of claim 1, wherein the first gear rotates about an axis transverse to an axis of rotation of the second gear.

4. The absolute position sensor of claim 1, wherein the spiral tooth of the second gear extends around a center of the second gear.

5. The absolute position sensor of claim 1, wherein the rotational position sensor comprises a Hall-effect sensor.

6. The absolute position sensor of claim 5, wherein the Hall-effect sensor comprises a pair of magnets coupled to and radially offset from a center of a hub of the first gear to rotate with the first gear.

7. The absolute position sensor of claim 6, further comprising a biasing member engaged with the first gear to bias the first gear toward the second gear.

8. The absolute position sensor of claim 7, further comprising a housing including an enclosure that encloses the hub of the first gear and the position sensor, and a biasing structure coupled to the enclosure by a living hinge, the biasing member is engaged with the biasing structure to bias the biasing structure into the first gear.

9. An electric power steering system comprising:
    a ballscrew-nut assembly comprising a ballscrew, a nut, and a motor operatively coupled to one of the ballscrew and the nut to be configured to rotate the one of the ballscrew and the nut; and
    an absolute position sensor comprising:
        a first gear having a plurality of teeth;
        a rotational position sensor operatively coupled to the first gear to be configured to detect a rotational position of the first gear; and
        a second gear coupled to one of the ballscrew and the nut and comprising a spiral tooth engaged with the plurality of teeth of the first gear to rotate with the first gear, the spiral tooth having a first end with a first distance from a center of the second gear, and an opposite second end with a second distance from the center of the second gear, the second distance being less than the first distance.

10. The electric power steering system of claim 9, wherein the second gear is concentrically arranged around the ballscrew.

11. The electric power steering system of claim 9, further comprising a pair of tie rods coupled to each end of the ballscrew that are operatively coupled to a pair of knuckles, and movement of the ballscrew pivots the pair of knuckles.

12. The electric power steering system of claim 9, wherein a difference between the first distance and the second distance is equal to a distance between apexes of adjacent teeth of the plurality of teeth.

13. The electric power steering system of claim 9, wherein the spiral tooth of the second gear extends around a center of the second gear.

14. The electric power steering system of claim 9, wherein the position sensor comprises a Hall-effect sensor.

15. The electric power steering system of claim 14, wherein the Hall-effect sensor comprises a pair of magnets coupled to and radially offset from a center of a hub of the first gear to rotate with the first gear.

16. The electric power steering system of claim 15, further comprising a biasing member engaged with the first gear to bias the first gear toward the second gear.

17. The electric power steering system of claim 16, further comprising a housing including an enclosure that encloses the hub of the first gear and the position sensor, and a biasing structure coupled to the enclosure by a living hinge, the biasing member is engaged with the biasing structure to bias the biasing structure into the first gear.

18. An electric power steering system comprising:
    a ballscrew;
    a nut engaged with the ballscrew, such that rotation of the nut relative to the ballscrew moves the ballscrew through the nut; and
    an absolute position sensor comprising:
        a first gear having a plurality of teeth;
        a rotational position sensor operatively coupled to the first gear to be configured to detect a rotational position of the first gear; and
        a second gear concentrically arranged around the ballscrew to rotate with one of the ballscrew and the nut, the second gear engaged with the plurality of teeth of the first gear to be configured to rotate with the first gear.

19. The electric power steering system of claim 18, wherein the second gear comprises a spiral tooth engaged with the plurality of teeth of the first gear to rotate with the first gear, and having a first end with a first distance from a center of the second gear, and an opposite second end with a second distance from the center of the second gear, the second distance being less than the first distance.

20. The electric power steering system of claim 18, further comprising:
    a biasing member engaged with the first gear to bias the first gear toward the second gear; and
    a housing including an enclosure that encloses a hub of the first gear and the position sensor, and a biasing structure coupled to the enclosure by a living hinge, the biasing member is engaged with the biasing structure to bias the biasing structure into the first gear.

* * * * *